Aug. 19, 1941.   K. G. CUNNINGHAM   2,253,419
PLOW LIFT MECHANISM
Filed Dec. 19, 1940
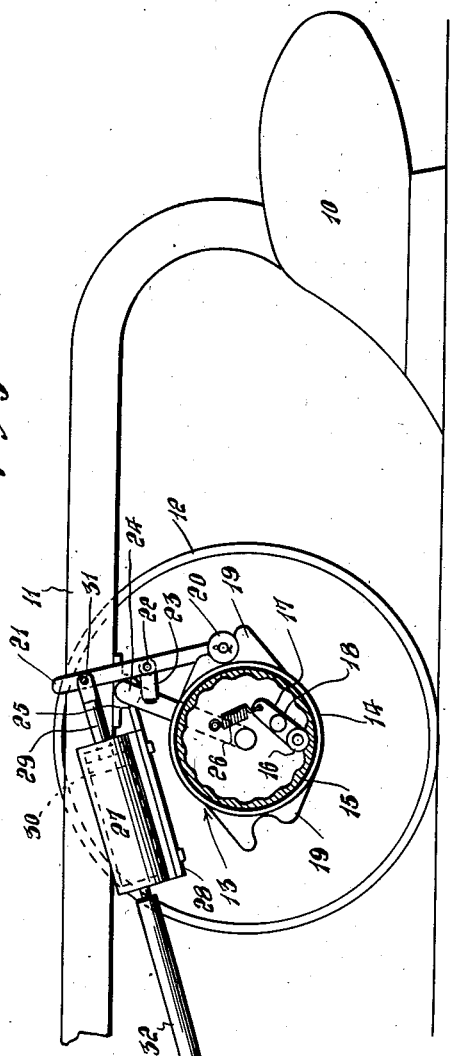
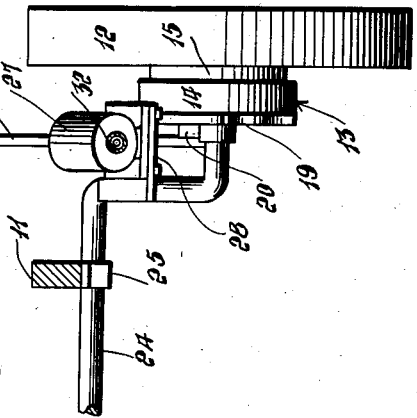
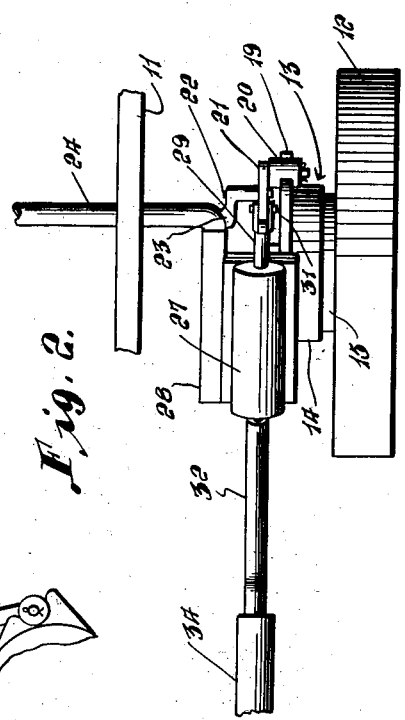
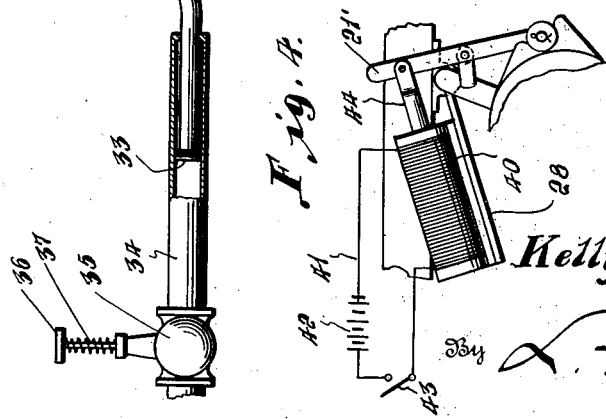
Inventor
Kelly G. Cunningham
By
Attorney Patented Aug. 19, 1941

2,253,419

UNITED STATES PATENT OFFICE 2,253,419

PLOW LIFT MECHANISM

Kelly Gore Cunningham, Evans, W. Va.

Application December 19, 1940, Serial No. 370,869

6 Claims. (Cl. 97—73)

This invention relates to a lifting mechanism for trailer type plows, such as are raised and lowered by a rope, lever or the like controlling a clutch, and aims to provide a construction which will not require the operator to remove a hand from the steering wheel of the plow or tractor incidental to its use, a construction which will enable the operator to make a closer turn, a construction which will reduce fuel consumption and operator fatigue, and a construction which will enable separation of the vacuum hose or the like in the event of undue tension caused by encountering an obstruction.

It is particularly aimed to provide a structure which is adapted for operation by the foot and by vacuum control from the intake manifold of the tractor engine or a vacuum pump operated by the tractor engine, as well as a construction which is applicable to various other types of agricultural machinery, and one which may utilize a solenoid in lieu of vacuum to operate the clutch lever, which solenoid may be energized by the storage battery of the tractor.

Various additional objects and advantages will become apparent from a consideration of the description following taken in connection with accompanying drawing illustrating an operative embodiment.

In said drawing—

Figure 1 is a view in elevation, partly broken away and in section to disclose details, of a plow equipped with my improvements;

Figure 2 is a plan view of the parts of Figure 1;

Figure 3 is a front elevation of the parts of Figure 2, and

Figure 4 is a fragmentary elevation of a modified form of construction.

Referring specifically to the drawing wherein like reference characters designate like or similar parts, 10 designates a plowshare which is to be taken as conventional and representative of any other agricultural or soil treating device, the same being carried by a beam 11 suitably attached to and adapted to trail a tractor, wheeled plow frame or the like.

Conventional lift means whereby the height of the plow 10 may be varied with respect to the land wheel shown at 12, is employed, having a conventional clutch mechanism as at 13. This clutch per se forms no part of the present invention but it will be mentioned that it has an annular driving clutch 14 and an annular driven clutch 15 which are adapted to be connected by a roller 16 on a lever 17 pivoted at 18 to the driven clutch member. The driven clutch member at opposite portions has dog members 19 adapted for coaction with a roll 20 pivoted on a trip lever 21, in turn pivoted at 22 on a projection 23 of an axle 24, suitably suspended and journaled in brackets 25 on the beam 11. It will be understood that the clutch 13, at portions 19, is engaged for each operation of raising or lowering the plow frame through oscillation of the tripping lever 21. Clutch part 17 is urged to the position shown in Figure 1 by a contractile spring 26 connected thereto and to the driven clutch element 15.

Usually, the tripping lever 21 is controlled through the operation of another lever and a rope or the like, which lever requires engagement and operation by the operator and hence removal of one hand from the steering wheel to raise or lower the plow. In accordance with the present invention, the operation of such tripping lever is controlled by the foot of the operator, and by vacuum, electricity or the like.

As shown in Figure 1, a cylinder 27 is fastened to a bracket 28 in turn fastened to the axle 24. The rod 29, extending from the piston 30 within the cylinder 27, is pivoted at 31 to the tripping lever 21. A flexible hose 32, of rubber or the like, is detachably and slip connected as at 33, with a vacuum conduit or pipe 34 connected to the intake manifold of the internal combustion engine on the tractor or wheeled plow, and which conduit 34 has a normally closed valve 35 therein which is adapted to be opened through depression of a pedal 36 thereon, the latter being normally urged elevated or closed by an expansive coil spring 37. If desired, a vacuum unit may be operated from the intake manifold or a vacuum pump operated by the tractor engine.

As a result of the construction described, the piston 30 is moved in the cylinder 27 by vacuum when the operator depresses the valve 36, such valve restoring to closed position when released. The reciprocation of rod 29 caused by the vacuum in tank 27 operates the tripping lever 21 so as to release and engage the dog portions 19.

Various changes may be resorted to provided they fall within the spirit and scope of the invention. For instance, I may use the form of Figure 4 employing a solenoid 40 which is wired in the circuit 41 of a battery 42, which may be the storage battery on the tractor, and which is adapted to be closed by the depression by the operator's foot, of a switch 43, which is normally open and urged to that position. Solenoid 40 has its core 44 connected to a tripping lever 21' which functions identical to that at 21. The structure otherwise is the same as described with reference to Figures 1 to 3 with the exception that the bracket 28, in this instance, mounts the solenoid 40. It is clear that when the operator depresses and closes the switch 43, the core 44 will reciprocate and function exactly like the rod 29 and thus coact with the tripping lever and clutch 13 in the same manner and to attain the same result as in the first form.

Should an undue obstruction be encountered by the plow or wheel causing relative movement between the hose 32 and 34, a slip will occur at the connection 33 to avoid breakage and in some instances the connection 33 will be completely detached from the conduit 34, it being a simple matter to reestablish the connection between the pipes 32 and 34 thereafter.

What is claimed is:

1. In a lift mechanism for the frame of a wheeled agricultural machine having a clutch between the frame and a wheel, a tripping element for said clutch, and power means under control of an operator to actuate said tripping element.

2. In a lift mechanism for the frame of a wheeled agricultural machine having a clutch between the frame and a wheel, a tripping element for said clutch, an axle for the wheel, an actuator for said tripping element mounted on said axle, and means under control of an operator for application of power to the actuator.

3. In a lift mechanism for the frame of a wheeled agricultural machine having a clutch between the frame and a wheel, a tripping element for said clutch, an axle for the wheel, an actuator for said tripping element mounted on said axle, means under control of an operator for application of power to the actuator, said actuator consisting of a vacuum cylinder and piston.

4. In a lift mechanism for the frame of a wheeled agricultural machine having a clutch between the frame and a wheel, a tripping element for said clutch, an axle for the wheel, an actuator for said tripping element mounted on said axle, means under control of an operator for application of power to the actuator, said actuator consisting of a solenoid.

5. In a lift mechanism for the frame of a wheeled agricultural machine having a clutch between the frame and a wheel, a tripping element for said clutch, an axle for the wheel, an actuator for said tripping element mounted on said axle, means under control of an operator for application of power to the actuator, said actuator consisting of a vacuum cylinder and piston, a pipe connection from the actuator to the source of vacuum.

6. In a lift mechanism for the frame of a wheeled agricultural machine having a clutch between the frame and a wheel, a tripping element for said clutch, an axle for the wheel, an actuator for said tripping element mounted on said axle, means under control of an operator for application of power to the actuator, said actuator consisting of a vacuum cylinder and piston, a pipe connection from the actuator to the source of vacuum, and said connection including parts constructed and arranged to separate through pull thereon, and said connection including a foot operable cut-off valve.

KELLY GORE CUNNINGHAM.